(12) United States Patent
Wikström et al.

(10) Patent No.: US 11,598,339 B2
(45) Date of Patent: Mar. 7, 2023

(54) PUMP AND METHOD FOR CONTROLLING A PUMP

(71) Applicant: Xylem Europe GmbH, Schaffhausen (CH)

(72) Inventors: Jan Wikström, Sundbyberg (SE); Gunnar Törnqvist, Vaxholm (SE)

(73) Assignee: Xylem Europe GmbH, Schaffhausen (CH)

( * ) Notice: Subject to any disclaimer, the term of this patent is extended or adjusted under 35 U.S.C. 154(b) by 219 days.

(21) Appl. No.: 16/766,113

(22) PCT Filed: Nov. 19, 2018

(86) PCT No.: PCT/EP2018/081671
§ 371 (c)(1),
(2) Date: May 21, 2020

(87) PCT Pub. No.: WO2019/101659
PCT Pub. Date: May 31, 2019

(65) Prior Publication Data
US 2021/0363999 A1    Nov. 25, 2021

(30) Foreign Application Priority Data
Nov. 24, 2017    (EP) .................................. 17203461

(51) Int. Cl.
*F04D 13/08*    (2006.01)
*F04D 13/06*    (2006.01)
(Continued)

(52) U.S. Cl.
CPC ............ *F04D 13/08* (2013.01); *F04B 49/025* (2013.01); *F04B 49/06* (2013.01); *F04B 49/065* (2013.01);
(Continued)

(58) Field of Classification Search
CPC .... F04D 15/0218; F04D 13/086; F04D 13/08; F04D 29/708; F04D 15/0077;
(Continued)

(56) References Cited

U.S. PATENT DOCUMENTS 2,910,003 A * 10/1959 Kaatz .................. F04D 15/0218
417/18
3,623,366 A    11/1971 Rowell
(Continued)

FOREIGN PATENT DOCUMENTS

| EP | 2039935 A2 | 3/2009 |
|---|---|---|
| JP | 0419518 A | 1/1992 |
| WO | 0105349 A2 | 1/2001 |

OTHER PUBLICATIONS

International Search Report and Written Opinion for International Application No. PCT/EP2018/081671, dated Feb. 14, 2019, 11 pages.

*Primary Examiner* — Peter J Bertheaud
(74) *Attorney, Agent, or Firm* — RatnerPrestia

(57) ABSTRACT

A pump having a drive unit with an electric motor, a hydraulic unit connected to the electric motor, and an integrated control unit operatively connected to the electric motor and configured for monitoring and controlling the pump. An integrated pressure sensor, connected to the control unit, has a fixed reference pressure. The control unit determines a liquid level of a liquid surrounding the pump based on a relation between an actual value of the pressure sensor and a reference value. A method for calibrating the pump comprises initiating pumping, continuing pumping until the liquid level is equal to a predetermined calibration level, determining the actual pressure value when the liquid level is equal to the predetermined calibration level, and
(Continued)

calibrating the pump by setting a new reference pressure value corresponding to the actual pressure value.

10 Claims, 2 Drawing Sheets

(51) Int. Cl.
- *F04D 13/10* (2006.01)
- *F04D 15/00* (2006.01)
- *F04D 15/02* (2006.01)
- *F04D 29/70* (2006.01)
- *F04B 49/06* (2006.01)
- *F04B 49/08* (2006.01)
- *F04B 49/025* (2006.01)

(52) U.S. Cl.
CPC .............. *F04B 49/08* (2013.01); *F04D 13/06* (2013.01); *F04D 13/086* (2013.01); *F04D 13/10* (2013.01); *F04D 15/00* (2013.01); *F04D 15/0066* (2013.01); *F04D 15/0077* (2013.01); *F04D 15/0209* (2013.01); *F04D 15/0218* (2013.01); *F04D 15/0236* (2013.01); *F04D 29/708* (2013.01)

(58) Field of Classification Search
CPC .. F04D 15/0236; F04D 15/00; F04D 15/0209; F04D 15/0066; F04D 13/06; F04D 13/10; F04B 49/065; F04B 49/025; F04B 49/08; F04B 49/06

See application file for complete search history.

(56) References Cited

U.S. PATENT DOCUMENTS

| | | |
|---|---|---|
| 4,091,669 A | 5/1978 | Fehr et al. |
| 4,627,281 A | 12/1986 | Tavis |
| 8,036,838 B2 * | 10/2011 | Parkinson ............... G01F 23/14 |
| | | 73/299 |
| 9,334,175 B2 * | 5/2016 | Bozak ................... C10G 1/045 |
| 11,234,577 B2 * | 2/2022 | Durham ............. A47L 15/4244 |

* cited by examiner

PUMP AND METHOD FOR CONTROLLING A PUMP

CROSS-REFERENCE TO RELATED APPLICATIONS

This patent application is a U.S. National Phase Patent Application of PCT Application No.: PCT/EP2018/081671, filed Nov. 19, 2018, which claims priority to European Patent Application No. 17203461.3, filed Nov. 24, 2017, each of which is incorporated by reference herein in its entirety.

TECHNICAL FIELD OF THE INVENTION

The present invention relates generally to the field of pumps configured to pump liquid comprising solid matter. Further, the present invention relates specifically to the field of drainage pumps especially configured for pumping liquid comprising sand and stone material, such as drilling water in mining/tunneling applications or surface water on construction sites, i.e. dewatering. The pump comprises an integrated control unit, a drive unit having an electric motor and a drive shaft, and a hydraulic unit having an impeller connected to said electric motor via said drive shaft, wherein the control unit is operatively connected to the electric motor and is configured for monitoring and controlling the operation of the pump. The invention also relates to a method for controlling such a pump.

BACKGROUND OF THE INVENTION

In mines, on construction sites, and the like applications, there is almost always a need to remove water in order to secure a dry enough environment at the working site. In mining/tunneling applications a lot of drilling water is used when preparing for charging before blasting and if the drilling water is not removed at least the lower parts of the mine will become flooded. Surface water and groundwater will also add up to accumulation of water to be removed. It is customary to use drainage pumps to lift the water out of the mine, and the water is lifted stepwise from the lower parts of the mine to different basins located at different depths of the mine. Each step/lift may for instance be in the range 25-50 meters in the vertical direction and the length of the outlet conduit, i.e. the transport distance, in each step/lift may for instance be in the range 100-300 meters. In mining applications a considerable amount of sand and stone material is suspended in the water, in some applications as much as 10%.

Generally the personnel, as well as the actual process at the working site, requires a constant low liquid level and therefor it is often decided that the drainage pump should be in constant operation even though there is momentary only little water available. Thus, in some applications the drainage pumps are in constant operation, irrespective of water being pumped or not. Constant operation of the drainage pump may damage the drainage pump and result in excessive energy consumption. If there is no or little inflow of water to the pit/dent housing the drainage pump, the drainage pump will start to heat the water, an operational mode referred to as boiling. During boiling, the elevated temperature in the drainage pump and in the water is especially harmful for the seals, and eventually all water will become evaporated. The combination of high operational speed and snoring accelerates pump wear and significantly shortens the operative life of the drainage pump. Constant operation is good and inevitable when there is a constant inflow to the pit/dent housing the pump.

In other applications, the drainage pump is operated in an automatic ON/OFF-operation, i.e. the pump is stopped when the water level surrounding the pump is low, for instance the pump is stopped when the pump is snoring or is stopped by means of a level sensor. The pump is snoring when a mixture of air and water is sucked into the inlet of the pump. The pump is stopped to decrease the use of energy when the pump is not able to perform any positive duty, and to spare the pump from additional wear.

Independently on operational mode it is important to know at least some specific liquid levels with high accuracy, in order to efficiently minimize wear and energy consumption during operation of the pump. The better knowledge about the momentary liquid level of the liquid surrounding the pump the more detailed and sophisticated methods for control the pump can be used. If the liquid level is high the pump might need to operate at maximum operational speed, at other liquid levels the pump can be run at reduced operational speed, and when the liquid level is low the pump should be stopped or the operational speed significantly reduced.

Conventionally a pump is equipped with external level sensors detecting when the liquid level reaches a pump start liquid level and a pump stop liquid level, respectively. These level sensors are of so-called discrete type, i.e. I/O. The external level sensors may be constituted by conventional floating level sensors that will detect a pump start liquid level when tilted a first angle and that will detect a pump stop liquid level when tilted a second angle. However, these floating level sensors may become prevented from floating freely due to solid matter in the liquid or by other external obstacles and thereby not able to detect the liquid level correctly. Some known pumps have other discrete type level sensors integrated into the pump.

In order to operate the pump more efficiently it is known to have external level sensors of analogous type, such as gauge pressure sensors. This kind of level sensor measure the pressure acting against the level sensor, and the measured pressure correspond to a submerged depth of the level sensor in relation to the liquid level. However, in order to provide accurate data, i.e. to compensate for air pressure differences in the atmosphere, such a level sensor solution also requires a reference gauge pressure sensor located above the liquid level. Se for instance U.S. Pat. No. 8,036, 838. These pressure sensors are expensive. Thereto, the pressure sensor detects the submerged depth of the pressure sensor and not of the pump as such. Thus it is vital, and at the same time almost impossible, to know the exact mutual location/orientation of the drainage pump and the external/detached pressure sensor. Thereto it is not suitable to have this type of external pressure sensor attached to the drainage pump since the risk of damage to the pressure sensor due to the rough environment/handling of the drainage pump is imminent.

Pumps, especially drainage pumps, which are truly mobile and configured to be located in various pits/dents in tough environments, there is an obvious disadvantage to have external level sensors.

OBJECT OF THE INVENTION

The present invention aims at obviating the aforementioned disadvantages and failings of previously known pumps, and at providing an improved pump. A primary object of the present invention is to provide an improved pump of the initially defined type that is capable of handling changing air pressure in the air located above the liquid surrounding the pump, and thereby reducing or eliminating the impact of changing air pressure. It is another object of the present invention to provide a pump that is not dependent on external level sensors.

SUMMARY OF THE INVENTION

According to the invention at least the primary object is attained by means of the initially defined pump and method having the features defined in the independent claims. Preferred embodiments of the present invention are further defined in the dependent claims.

According to a first aspect of the present invention, there is provided a method of the initially defined type, wherein the pump further comprises an integrated pressure sensor that has fixed reference pressure and that is operatively connected to the control unit, said control unit being configured to determine the liquid level of the liquid surrounding the pump based on a relation between the actual value of the pressure sensor and a reference value, wherein said method comprises a sub-method for calibrating the pump and comprises the steps of initiate pumping, continue pumping until the liquid level of the liquid surrounding the pump is equal to a predetermined calibration level, the predetermined calibration level being fixed in relation to the pump, determining a calibration level actual value of the pressure sensor when the liquid level of the liquid surrounding the pump is equal to said predetermined calibration level, and calibrating the pump by setting a new reference value corresponding to said calibration level actual value.

According to a second aspect of the present invention, there is provided a pump configured to execute the steps of said sub-method.

Thus, the present invention is based on the insight of using an integrated pressure sensor that has fixed reference pressure and performing regular calibration of the pump and integrated pressure sensor, the liquid level can be determined with high accuracy also in environments/situations having changing air pressure, and thereby the operation of the pump can be better adapted to the actual need over time. Thereto the pressure sensor is protected by the pump from external damage.

In a preferred embodiment of the present invention, the sub-method comprises the step of stopping the pump when the liquid level of the liquid surrounding the pump is equal to the calibration level. Thereto it is preferable that the step of determining the calibration level actual value of the pressure sensor is performed after the step of stopping the pump. Thereby, any potential effect on the pressure reading arising from the pumping operation of the pump is eliminated.

According to a preferred embodiment, the calibration level of the pump is on a level with an inlet of the pump, wherein the liquid level of the liquid surrounding the pump is determined as being equal to the calibration level when the control unit detects that the pump is snoring. It is important that the location of the calibration level in relation to the pump is constant over time, and snoring occur when the pump sucks a mixture of air and liquid into the inlet, i.e. at the same liquid level every time. In order to detect whether the pump is snoring or not, the control unit utilize one or more known snoring detection techniques.

According to a preferred embodiment, the sub-method for calibrating the pump and pressure sensor is performed at regular time intervals, and thereto every time the pump is energized/restarted. A more frequent calibration of the pump better eliminates any effect of changing air pressure.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates specifically to the field of pumps especially configured for pumping liquid comprising solid matter, such as water comprising sludge/mud, sand and stone material.

Figure 1:
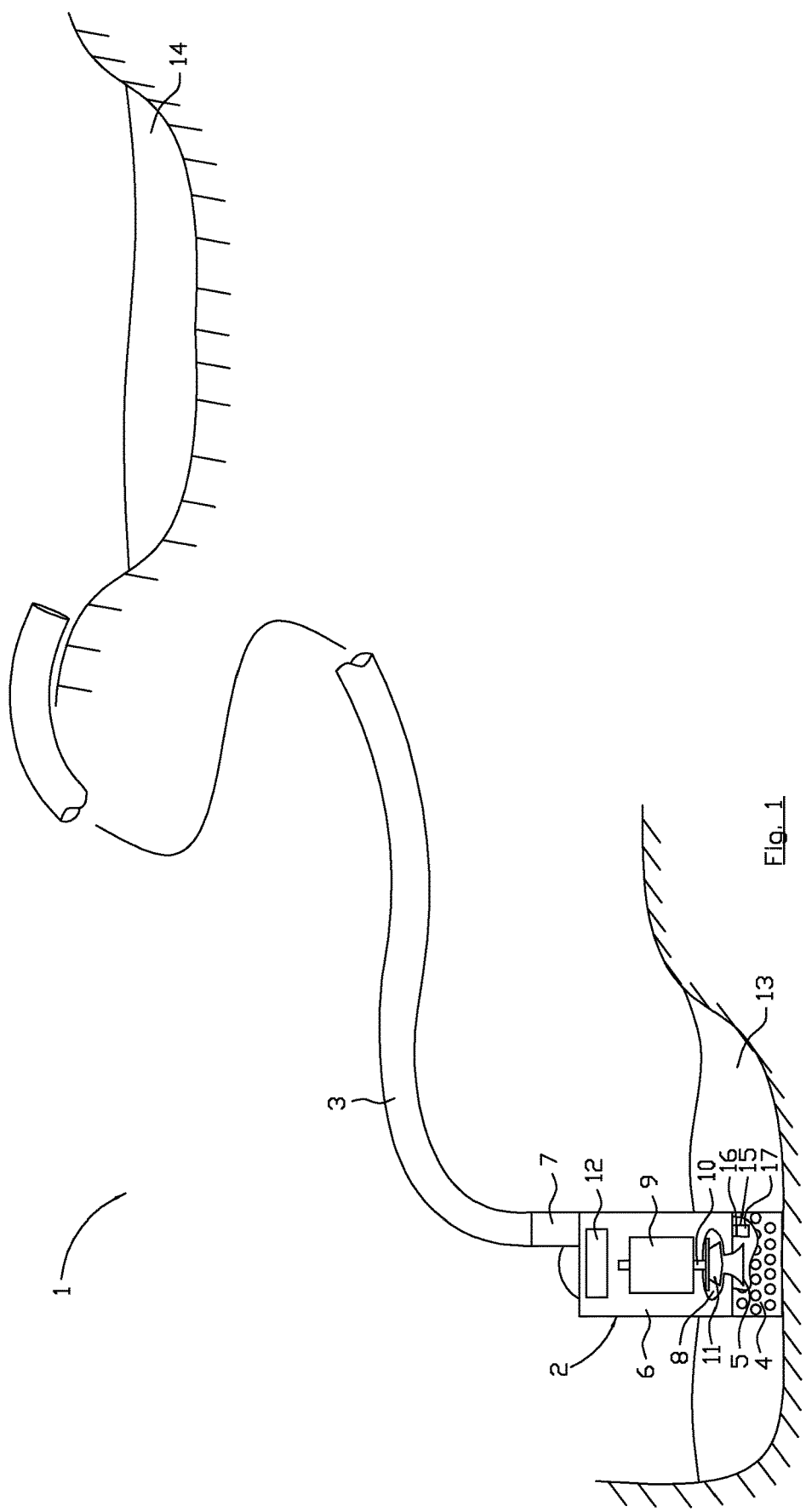
FIG. 1 is a schematic illustration of an inventive pump located in a mine.

Reference is made to FIG. 1, disclosing a schematic embodiment of a pump assembly suitable for pumping liquid comprising solid matter, generally designated 1, i.e. drainage/dewatering pump assembly. The pump assembly 1 comprises a pump 2 and an outlet conduit 3 that is releasably connected to the pump 2. The pump 2 is preferably of centrifugal pump type.

In the disclosed embodiment the pump 2 is constituted by a drainage/dewatering pump. Herein, for sake of clarity, the term drainage pump will be used as fully equivalent with the generic term pump, and it shall be realized that also other pumps than drainage pumps are concerned, if nothing else is indicated.

The disclosed drainage pump 2 comprises an inlet screen 4, an inlet 5, a pump housing 6 and a pump outlet 7. Thereto, the drainage pump 2 comprises in a conventional way a hydraulic unit having a pump chamber 8, and comprises a drive unit. The drive unit and the pump chamber 8 are arranged in the pump housing 6. The drive unit comprises an electric motor 9 arranged in the liquid tight pump housing 6, and a drive shaft 10 extending from the electric motor 9 to the pump chamber 8. The hydraulic unit comprises an impeller 11 that is arranged in the pump chamber 8 and is connected to and driven in rotation by the drive shaft 10 during operation of the drainage pump 2, wherein liquid is sucked through said inlet screen 4 and into the inlet 5 and pumped out of said outlet 7 when the drainage pump 2 is active. The pump housing 6 and the impeller 11, and other essential components, are preferably made of metal, such as aluminum and steel. The drainage pump 2, more precisely the electric motor 9, is powered via an electric cable extending from a power supply, and the drainage pump 2 comprises a liquid tight lead-through receiving the electric cable.

The electric motor 9 is operatively connected to a control unit 12, also known as Intelligent Drive, integrated into the pump 2 and configured for monitoring and controlling the operation of the drainage pump 2. Thus, the control unit 12 monitors the status of the pump and the nature of the pumping operation, and controls the pump 2 to operate according to given and/or optimal strategies/modes. The control unit 12, including a Variable Frequency Drive (VFD) of the control unit 12, is located inside a liquid tight compartment of the pump housing 6. Thus, said drainage pump 2 is configured to be operated at a variable operational speed [rpm], by means of said control unit 12 that is configured to control the operational speed of the drainage pump 2. The operational speed of the drainage pump 2 is more precisely the rpm of the electric motor 9 and of the impeller 11, and correspond/relate to a control unit 12 output frequency.

The components of the drainage pump 2 are usually, directly or indirectly, cold down by means of the liquid/water surrounding the drainage pump 2. The drainage pump 2 is designed and configured to be able to operate in a submerged configuration/position, i.e. during operation be located entirely under the liquid surface. However, it shall be realized that the submersible drainage pump 2 during operation must not be entirely located under the liquid surface but may continuously or occasionally be partly located above the liquid surface.

The drainage pump 2 is in the disclosed application located in a first/lower basin 13 and is intended to transport/pump liquid comprising solid matter from said first/lower basin 13 to a second/higher basin 14. Thereto, it shall be realized that it is conceivable that another drainage pump is located in the second basin 14 and intended to transport the liquid from the second basin 14 to a third basin, etc. The basins may be natural recesses/cavities/pits or prepared recesses/cavities/pits.

Thereto, the drainage pump 2 further comprises an integrated pressure sensor 15 that has fixed reference pressure and that is operatively connected to the control unit 12. The pressure sensor 15 is configured to be in contact with said liquid during operation of the drainage pump 2 and is preferably located in the volume delimited by the inlet screen 4. The pressure sensor 15 is located upstream the inlet 5 of the pump 2. Thus, the pressure sensor 15 is arranged to monitor the changing pressure, i.e. the sum of the liquid pressure and the air pressure, acting on the pressure sensor 15. The pressure sensor 15 has its own fixed reference pressure within or outside the sensor. Thus, the gas volume having the fixed reference pressure can be located within the sensor or within a cavity in the pump. The fixed reference pressure is constant over time. Thus, the pressure sensor 15 is constituted by a socalled sealed pressure sensor, preferably a socalled absolute pressure sensor. In an absolute pressure sensor the reference pressure is usually vacuum, nearly vacuum or at least much less than atmospheric pressure. However, it shall be pointed out that in general sealed pressure sensors other self-chosen reference pressure levels are conceivable. The fixed reference pressure is preferably in the range equal to or below 500 hPa, most preferably equal to or below 300 hPa, and equal to or above vacuum.

The pressure sensor 15 is configured to be in operation at different altitude, i.e. at sites located several thousand meters above sea level (e.g. 400 hPa) and at sites located below sea level (e.g. 1150 hPA). The pressure sensor 15 is configured to be in operation at varying ambient pressure, i.e. atmospheric low pressure (e.g. 980 hPa at sea level) and atmospheric high pressure (e.g. 1040 hPa at sea level). The pressure sensor 15 is configured to be in operation at different submerged depths, i.e. from not submerged at all to submerged up to 3 meters, preferably submerged up to 5 meters (i.e. about 500 hPA). The pressure sensor 15 is preferably configured to be exposed to pressures within a range from 500 hPa to 1500 hPA, preferably within a range from 300 hPa to 2000 hPa.

It shall be pointed out that the liquid can be in direct contact or indirect contact with the membrane/diaphragm 16 of the pressure sensor 15. It is preferred that the liquid is only in indirect contact with the membrane 16, via a gas, in order to prevent fouling of the membrane 16 that otherwise may entail faulty reading. In the preferred embodiment, the pressure sensor 15 comprises an inlet tube 17 having a lower opening opened towards the liquid, wherein a small air cushion within the inlet tube 17 separates the membrane 16 from the liquid. Thereby the membrane 16 is protected against any possible adverse impact from the solid matter in the liquid. The lower opening of the inlet tube 17 of the pressure sensor 15 is preferably located at a level below the inlet 5 of the drainage pump 2. However, alternatively the lower opening of the inlet tube 17 of the pressure sensor 15 is located at the same level as the inlet 5 of the pump 2, or at a level above the inlet 5 of the drainage pump 2. The lower opening of the inlet tube 17 shall be located at a level equal to or below 40 cm above the inlet 5 of the pump 2.

By having a pressure sensor 15, i.e. an analog level sensor, the operation of the pump 2 can be more sophisticated. For instance continuously adapted to the momentary liquid level.

The control unit 12 is configured to determine the momentary liquid level of the liquid surrounding the drainage pump 2 based on a relationship between the momentary actual value of the pressure sensor 15 and a reference value of the pump 2. The reference value of the drainage pump 2 is determined and calibrated when the liquid level of the liquid surrounding the drainage pump 2 is equal to a predetermined calibration level that is fixed in relation to the drainage pump 2. For instance the control unit 12 may utilize a lock-up table or a mathematical function, wherein the input data is constituted by at least the present/current reference value of the drainage pump 2 and the momentary actual value of the pressure sensor 15, and the output data is constituted by at least the momentary liquid level of the liquid surrounding the drainage pump 2. It shall also be understood that the step of determining the liquid level of the liquid surrounding the drainage pump 2 in practice means determination of the location of the liquid level in relation to the drainage pump 2, i.e. the submerged depth of inlet 5 of the drainage pump 2 or the submerged depths of the bottommost part of the drainage pump 2 or the submerged depth of the pressure sensor 15 or the like. During operation of the pump 2, the determination of the momentary liquid level may be performed continuously or at predetermined time intervals. The pump 2 can be active or inactive during the determination of the liquid level.

It is important to have a reference value that is frequently calibrated in order to be able to accurately determine the liquid level of the liquid surrounding the drainage pump 2 over time. Thus, the pump 2, including the absolute pressure sensor 15, has to be frequently calibrated. It is important because the air pressure acting on the liquid surface change over time, due to changing weather conditions, i.e. high pressure versus low pressure at the location of the drainage pump 2, due to change in altitude of the drainage pump 2, e.g. the pump is moved a great distance in the vertical direction within a mine, due to man-made changes to the air pressure, e.g. extensive ventilation in a mine. For instance, the air pressure difference between high pressure and low pressure in the weather is about 40-50 hPa corresponding to about a 40-50 cm faulty value when determining the liquid level of the liquid surrounding the drainage pump 2. Manmade air pressure differences may in extreme conditions be about 500 hPa corresponding to about a 500 cm faulty value when determining the liquid level of the liquid surrounding the drainage pump 2. This will potentially cause problem with flooding if the pump 2 believes that the liquid level is lower than it truly is, or cause problem with excessive dry running of the drainage pump 2 if the pump believes that the liquid level is higher than it truly is. It shall be pointed out that, in some applications the vertical difference between start and stop is even less than 50 centimeters.

Figure 2:
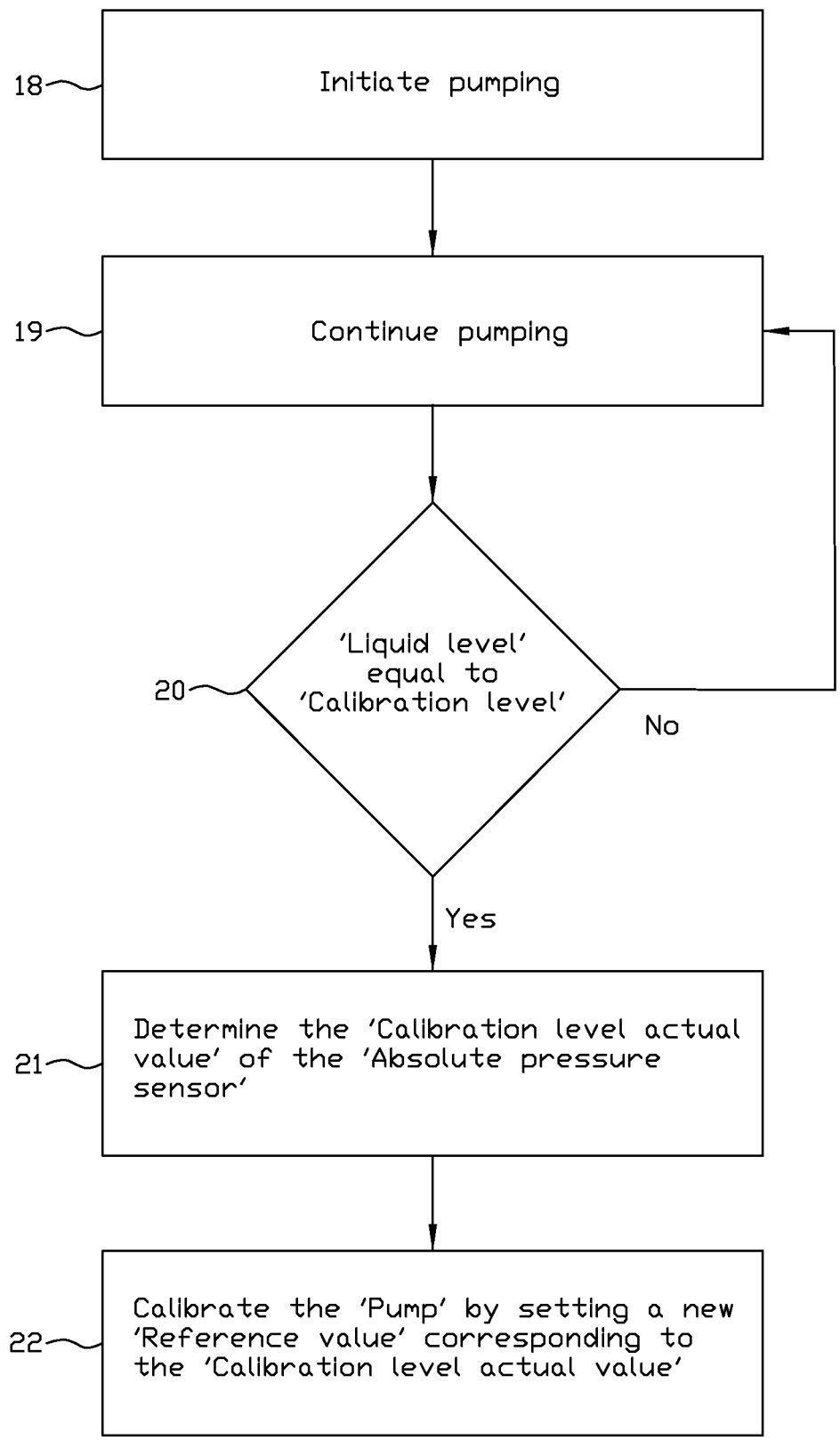
FIG. 2 is a schematic flow chart of the sub-method of the inventive method.

Thus, the inventive method for controlling a pump 2 comprises a sub-method for calibrating the pump 2, wherein the sub-method is schematically disclosed in FIG. 2 and comprises the essential steps of:

initiate pumping, (box 18), continue pumping until the liquid level of the liquid surrounding the pump 2 is equal to a predetermined calibration level, the predetermined calibration level being fixed in relation to the pump 2, (boxes 19-20), determining a calibration level actual value of the pressure sensor 15 when the liquid level of the liquid surrounding the pump 2 is equal to said predetermined calibration level, (box 21), and calibrating the pump 2 by setting a new reference value corresponding to said calibration level actual value, (box 22).

The step initiate pumping (box 18) entails that the control unit 12 controls the electric motor 9, the drive shaft 10 and the impeller 11 to start to rotate in order to pump liquid. The step initiate pumping (box 18) may be performed as a response to a pump start liquid level being reached or as a response to an instruction in the control unit 12 independently of the current/present liquid level, i.e. based on time or the like.

The step continue pumping (box 19) until the liquid level of the liquid surrounding the pump 2 is equal to a predetermined calibration level (box 20), entails that the control unit 12 monitors when the liquid level has decreased to the predetermined calibration level. The occurrence of the liquid level being equal to the calibration level is not monitored by the pressure sensor 15, but is monitored by the control unit 12 via other sensors/equipment. The calibration level is fixed in relation to the pump 2, and according to a preferred embodiment the calibration level is on a level with the inlet 5 of the pump 2, wherein the liquid level of the liquid surrounding the pump is determined as being equal to the calibration level when the control unit 12 detects that the pump 2 is snoring. According to another embodiment a liquid detector sensor is connected to the outside of the pump 2, the calibration level of the pump 2 being on a level with said liquid detector sensor, wherein the liquid level of the liquid surrounding the pump is determined as being equal to the calibration level when the signal from the liquid detector sensor to the control unit 12 is changed, i.e. when the liquid detector sensor does not detect the presence of liquid any longer.

The step calibrating the pump 2 (box 22) entails that a new reference value is set in the pump 2, for instance in the control unit 12 or in the pressure sensor 15, wherein the reference value correspond to the calibration level actual value of the pressure sensor 15. The reference value is preferably set equal to the calibration level actual value, wherein the control unit 12 during operation of the pump 2 determines the momentary liquid level of the liquid surrounding the pump 2 based on the difference between a momentary actual value of the pressure sensor 15 and the present/current reference value of the pump 2. A specific difference between the actual value of the pressure sensor 15 and the present/current reference value of the pump 2, correlates directly to the difference in height between the momentary liquid level and the predetermined calibration level.

According to a preferred embodiment, the sub-method also comprises the step of stopping the pump 2 when the liquid level of the liquid surrounding the pump 2 is equal to the calibration level. Thereto, it is preferred that the step of determining the calibration level actual value of the pressure sensor 2 is performed after the step of stopping the pump 2. Thus, the pump 2 does not disturb the liquid surrounding the pump 2 when the calibration level actual value is determined, and thereby the risk of having a faulty value is prevented.

The sub-method of calibrating the drainage pump 2 is preferably performed at regular time intervals, for instance every 3-240 minutes, and/or every time the pump 2 is energized/activated. According to an alternative embodiment the sub-method of calibrating the pump 2 is performed every time pumping is initiated, i.e. each time the pump 2 lower the momentary liquid level of the liquid surrounding the pump 2 to the predetermined calibration level. In other words the pump stop liquid level is equal to the calibration level. Thus, this is especially useful in applications having large amount of inflow to the pump 2 and the pump therefor is operating long period of times (hours or days) in order to be able to reach the calibration level.

In some applications the drainage pump 2 is continuously operating, i.e. the impeller 11 is rotating in a positive direction. The positive direction of the rotation of the impeller 11 is equal to the direction of rotation used in order to pump liquid from the inlet 5 towards the outlet 7 of the drainage pump 2. Increasing the operational speed of a drainage pump 2 pumping liquid/water comprising solid matter, i.e. a slurry, from a low rotational speed in the positive direction requires much less energy than increasing the operational speed of the drainage pump 2 to the same speed from stand still, especially due to the great moment of inertia that has to be overcome when starting such a drainage pump 2 from standstill. An even worse situation is to increase the operational speed of a drainage pump 2 in the positive direction from a forced rotation in the negative direction. This situation would arise if the drainage pump 2 is put in idle and the liquid flow backwards through the outlet conduit 3 and through the drainage pump 2 into the first basin 13, thereby the impeller 11 will be forced to rotate in the negative direction, as a water turbine. If the drainage pump 2 is instructed to increase the operational speed in the positive direction, directly from a negative rotation, the protective motor switch will most certainly release/trig. Thereto, it is an explicit requirement from the operators/customers that the drainage pump 2 shall always be operating/running, since a standstill in the mine due to a flooded horizontal gallery is extremely costly and thus the operators/costumers are more willing to have excessive wear on the drainage pumps.

The step of detecting whether the drainage pump 2 is snoring or not, may be performed using different techniques, independently or in combination with each other. The term "snoring" entails that the drainage pump 2 is operated in a snoring operational mode, i.e. the drainage pump 2 sucks a mixture of air and liquid into the inlet 5. The control unit 12 controls the drainage pump 2, at each moment/time, to have a predetermined operational speed.

A preferred embodiment to detect snoring is to monitor the power or current consumption of the drainage pump 2 using the control unit 12. If the power or current consumption of the drainage pump 2 starts to widely fluctuate outside a predetermined range and/or decrease below a predetermined threshold, the drainage pump 2 has started to snore and the control unit 12 detects a snoring condition.

An alternative embodiment to detect snoring is to monitor the torque of the drainage pump 2 using the control unit 12. If the torque of the drainage pump 2 starts to widely fluctuate outside a predetermined range and/or decrease below a predetermined threshold, the drainage pump 2 has started to snore and the control unit 12 detects a snoring condition.

Other alternative embodiments to detect snoring constitute monitoring one or more of sounds, vibrations, pressure at the outlet 7, etc. of the drainage pump 2.

The pump 2 comprises means adapted to execute the steps of the above method. Many of the steps of the above method are preferably performed/controlled by the control unit 12, and thus the term "the drainage pump 2 comprises means . . . " does not necessarily imply that said means has to be located within the pump housing of the drainage pump 2. Thus the term also includes means accessible/available/operatively connected to the drainage pump 2.

A computer program product/package comprising instructions to cause the pump 2 to execute the steps of the above method, is accessible/available/operatively connected to the drainage pump 2. Said computer program product is preferably located/run in the control unit 12.

Thereto, it shall be pointed out that the pump preferably, by the choice of the operator, shall be configured to be operated in common ON-OFF fashion during normal operation, i.e. the pump is controlled by level sensors to start pumping at a liquid start level and stop pumping at a liquid stop level.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall be pointed out that the term "integrated" herein has the meaning of "being part of a united/aggregated assembly".

It shall also be pointed out that the term "monitor a liquid level" also can be termed "measure a liquid level", "determine a liquid level", "sense a liquid level", "detect a liquid level".

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A method for controlling a pump configured for pumping liquid containing solid matter and that is at least partly submerged in the liquid during operation of the pump, the pump system comprising:
   a drive unit having an electric motor and a drive shaft;
   a hydraulic unit having an impeller connected to the electric motor via the drive shaft; and
   an integrated control unit operatively connected to the electric motor and configured for monitoring and controlling the operation of the pump; and
   an integrated pressure sensor having a fixed reference pressure value operatively connected to the control unit, the control unit configured to determine a liquid level of the liquid surrounding the pump based on a relation between an actual value of the pressure sensor and the fixed reference pressure value;
   the method comprising the steps of:
   initiating pumping with the pump,
   continuing pumping until the liquid level of the liquid surrounding the pump is equal to a predetermined calibration level fixed in relation to the pump,
   determining a calibration level actual value of the pressure sensor when the liquid level of the liquid surrounding the pump is equal to the predetermined calibration level, and
   calibrating the pump by setting the fixed reference pressure value to a new reference value corresponding to the calibration level actual value.

2. The method of claim 1, wherein the pub method comprises the step of stopping the pump when the liquid level of the liquid surrounding the pump is equal to the calibration level.

3. The method of claim 2, wherein the step of determining the calibration level actual value of the pressure sensor is performed after the step of stopping the pump.

4. The method of claim 1, wherein the calibration level of the pump is on a level with an inlet of the pump, wherein the liquid level of the liquid surrounding the pump is determined as equal to the calibration level when the control unit detects that the pump is snoring.

5. The method of claim 1, wherein the pump further comprises a liquid detector sensor connected to an outside of the pump at a same level as the calibration level of the pump, wherein the liquid level of the liquid surrounding the pump is determined as equal to the calibration level when the signal from the liquid detector sensor to the control unit is changed.

6. The method of claim 1, comprising performing the method for calibrating the pump at regular time intervals.

7. The method of claim 1, comprising performing the method for calibrating the pump every time the pump is energized.

8. A computer program product comprising a non-transitory computer-readable medium storing a program including instructions for execution by an integrated control unit of a pump for pumping liquid containing solid matter and configured to be at least partly submerged in the liquid during operation of the pump, the pump comprising:
   a drive unit having an electric motor and a drive shaft;
   a hydraulic unit having an impeller connected to the electric motor via the drive shaft; and
   an integrated control unit operatively connected to the electric motor and configured for monitoring and controlling operation of the pump;
   an integrated pressure sensor having a fixed reference pressure value and operatively connected to the integrated control unit, the integrated control unit configured to determine a liquid level of the liquid surrounding the pump based on a relation between the actual value of the pressure sensor and the fixed reference pressure value;

the instructions when executed by the integrated control unit integrated control unit, configure the pump to:

initiate pumping with the pump, continue pumping until the liquid level of the liquid surrounding the pump is equal to a predetermined calibration level fixed in relation to the pump, determine a calibration level actual value of the pressure sensor when the liquid level of the liquid surrounding the pump is equal to the predetermined calibration level, and calibrate the pump by setting the fixed reference pressure value to a new reference value corresponding to the calibration level actual value.

9. The computer program product of claim 8, wherein the program further includes instructions that, when executed by the integrated control unit, causes the pump to stop the pump when the liquid level of the liquid surrounding the pump is equal to the calibration level.

10. The computer program product of claim 9, wherein determining the calibration level actual value of the pressure sensor is performed after stopping the pump.

* * * * *

UNITED STATES PATENT AND TRADEMARK OFFICE
CERTIFICATE OF CORRECTION

PATENT NO. : 11,598,339 B2
APPLICATION NO. : 16/766113
DATED : March 7, 2023
INVENTOR(S) : Jan Wikström and Gunnar Tornqvist It is certified that error appears in the above-identified patent and that said Letters Patent is hereby corrected as shown below:

In the Claims

In Claim 2, Column 10, Line 30, "pub" should be deleted.

Signed and Sealed this
Sixteenth Day of May, 2023

Katherine Kelly Vidal
*Director of the United States Patent and Trademark Office*